US009250932B2

(12) United States Patent  (10) Patent No.: US 9,250,932 B2
Locascio et al.  (45) Date of Patent: *Feb. 2, 2016

(54) PROGRAMMABLE MULTIMEDIA CONTROLLER WITH FLEXIBLE USER ACCESS AND SHARED DEVICE CONFIGURATIONS

(71) Applicant: Savant Systems, LLC, Hyannis, MA (US)

(72) Inventors: Timothy R. Locascio, Osterville, MA (US); Robert P. Madonna, Osterville, MA (US); David McKinley, Dartmouth, MA (US); Michael C. Silva, East Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/246,691

(22) Filed: Apr. 7, 2014

(65) Prior Publication Data

US 2014/0223167 A1 Aug. 7, 2014

Related U.S. Application Data

(63) Continuation of application No. 13/238,141, filed on Sep. 21, 2011, now Pat. No. 8,719,581.

(60) Provisional application No. 61/385,437, filed on Sep. 22, 2010.

(51) Int. Cl.
*G06F 11/30* (2006.01)
*G06F 9/445* (2006.01)
(Continued)

(52) U.S. Cl.
CPC ........ *G06F 9/44505* (2013.01); *H04L 12/2829* (2013.01); *H04N 21/4131* (2013.01);
(Continued)

(58) Field of Classification Search
CPC ............ G06F 9/44505; H04L 12/2829; H04N 21/4131; H04N 21/42204; H04N 21/4325; H04N 21/43615; H04N 21/4751; H04N 21/4753; H04N 21/4858
USPC .......................................................... 713/183
See application file for complete search history.

(56) References Cited

U.S. PATENT DOCUMENTS 6,584,493 B1   6/2003 Butler
7,480,746 B2   1/2009 Simon et al.
(Continued)

FOREIGN PATENT DOCUMENTS

FR   2845229 A1   4/2004
JP   07-182288 A   7/1995
(Continued)

OTHER PUBLICATIONS

Valtchev, Dimitar et al., "Service Gateway Architecture for a Smart Home," IEEE Communications Magazine, IEEE Service Center, Piscatway, US, vol. 40, No. 4, Apr. 1, 2002, pp. 126-132.
(Continued)

*Primary Examiner* — Dant Shaifer Harriman
*Assistant Examiner* — Abiy Getachew
(74) *Attorney, Agent, or Firm* — Cesari and McKenna, LLP; James A. Blanchette

(57) ABSTRACT

In one embodiment, a programmable multimedia controller that is capable of interfacing with and controlling audio, video, telephony or heating ventilation, and air conditioning (HVAC) devices. A first mobile device and a second mobile device of a same type are configured to communicate with the programmable multimedia controller. The first mobile device obtains a first copy of a sharable device configuration including data for rendering a user interface usable to control the programmable multimedia controller. It stores the first copy of the sharable device configuration and thereby is considered a master device with respect to other devices of the same type. The second mobile device obtains a second copy of the sharable device configuration for use on the second mobile device from the master device.

20 Claims, 5 Drawing Sheets

(51) Int. Cl.

| | | |
|---|---|---|
| *H04L 12/28* | (2006.01) | |
| *H04N 21/41* | (2011.01) | |
| *H04N 21/422* | (2011.01) | |
| *H04N 21/432* | (2011.01) | |
| *H04N 21/436* | (2011.01) | |
| *H04N 21/475* | (2011.01) | |
| *H04N 21/485* | (2011.01) | |

(52) U.S. Cl.
CPC ..... *H04N21/42204* (2013.01); *H04N 21/4325* (2013.01); *H04N 21/43615* (2013.01); *H04N 21/4751* (2013.01); *H04N 21/4753* (2013.01); *H04N 21/4858* (2013.01)

(56) References Cited

U.S. PATENT DOCUMENTS

| | | |
|---|---|---|
| 7,930,644 B2 | 4/2011 | Silva et al. |
| 7,979,880 B2 | 7/2011 | Hosea et al. |
| 2002/0191596 A1 | 12/2002 | Mayano et al. |
| 2005/0057699 A1 | 3/2005 | Bowser |
| 2005/0169219 A1 | 8/2005 | Serpa et al. |
| 2005/0243093 A1 | 11/2005 | Macauley et al. |
| 2005/0273489 A1* | 12/2005 | Pecht et al. .................. 709/203 |
| 2006/0089727 A1 | 4/2006 | Drouet et al. |
| 2007/0055390 A1 | 3/2007 | Simon et al. |
| 2007/0142022 A1* | 6/2007 | Madonna et al. ............ 455/352 |
| 2007/0143801 A1 | 6/2007 | Madonna et al. |
| 2007/0197160 A1 | 8/2007 | Health et al. |
| 2008/0062965 A1 | 3/2008 | Silva et al. |
| 2008/0141316 A1 | 6/2008 | Igoe et al. |
| 2008/0166105 A1 | 7/2008 | Vanderhoff |
| 2009/0070436 A1 | 3/2009 | Dawes et al. |
| 2009/0083634 A1 | 3/2009 | Madonna et al. |
| 2010/0095332 A1 | 4/2010 | Gran et al. |
| 2010/0138007 A1 | 6/2010 | Clark et al. |
| 2010/0211636 A1 | 8/2010 | Starkenburg et al. |
| 2012/0084472 A1 | 4/2012 | Locascio et al. |

FOREIGN PATENT DOCUMENTS

| | | |
|---|---|---|
| JP | 2002-049488 A | 2/2002 |
| JP | 2002-521873 A | 7/2002 |
| JP | 2004-260447 A | 9/2004 |
| JP | 2009-523272 A | 6/2009 |
| JP | 2010-505351 A | 2/2010 |
| WO | WO-2009/093538 A1 | 7/2009 |

OTHER PUBLICATIONS

"Notification of Transmittal of the International Search Report and the Written Opinion of the International Searching Authority, or the Declaration," International Filing Date: Sep. 22, 2011, International Application No. PCT/US2011/001635, Applicant: Savant Systems, LLC., Date of Mailing: Nov. 18, 2011, pp. 1-18.

"Yamaha DME Designer Manual," Version 2.0, Yamaha Corporation, Copy Right 2004, pp. 1-482.

* cited by examiner

PROGRAMMABLE MULTIMEDIA CONTROLLER WITH FLEXIBLE USER ACCESS AND SHARED DEVICE CONFIGURATIONS

CROSS-REFERENCE TO RELATED APPLICATIONS

The present application is a continuation of U.S. patent application Ser. No. 13/238,141, filed on Sep. 21, 2011, by Timothy R. Locascio, et al. for a "Programmable Multimedia Controller with Flexible User Access and Shared Device Configurations", now issued as U.S. Pat. No. 8,719,581, which claims the benefit of U.S. Provisional Patent Application Ser. No. 61/385,437, filed on Sep. 22, 2010, by Timothy R. Locascio, et al. for a "Programmable Multimedia Controller with Flexible User Access and Shared Device Configurations", both of which are incorporated by reference herein in their entirety.

BACKGROUND OF THE INVENTION

Field of the Invention

The present invention relates generally to the fields of multimedia and communications and, more specifically, to a programmable multimedia controller for home automation or commercial applications which is capable of interfacing with, controlling and managing a wide variety of audio, video, telecommunications, data communications and other devices.

SUMMARY OF THE INVENTION

In brief summary, in accordance with one aspect of the invention, a system which includes a programmable multimedia controller is provided in which flexible user access is provided through a combination of user profiles and usernames/passwords. A user profile, which specifies a level of access to or control over the system, may be created and associated with an individual user or a designated group of users. Each individual user is assigned a username and password which are stored as part of the associated user profile. When a valid username and password are entered, a user is allowed to access and control the system in accordance with the associated user profile. A master user profile may be created which enables essentially unrestricted access to and control over the system. Other non-master user profiles may be created which enable restricted access to or control over the system and which are appropriate for younger users, guests, temporary users or others.

In accordance with another aspect of the invention, a configuration for a given device which may form part of the system or may interoperate with the system may be shared by multiple similar devices. A device configuration typically includes graphics data, system commands and system state information necessary to render an appropriate user interface on the device. Sharing device configurations reduces both the time required to complete and cost of overall system configuration because it eliminates the need to create a separate device configuration for each separate device that is initially part of the system or may become part of the system at a later time. In addition, for devices which include sufficient data storage capability, a shared device configuration may be stored in a master device and distributed to other similar non-master devices as needed, as opposed to distributing the shared device configuration from the programmable multimedia controller to each non-master device. This arrangement advantageously reduces demand on the resources of the programmable multimedia controller as well as the network which interconnects the controller and the devices.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
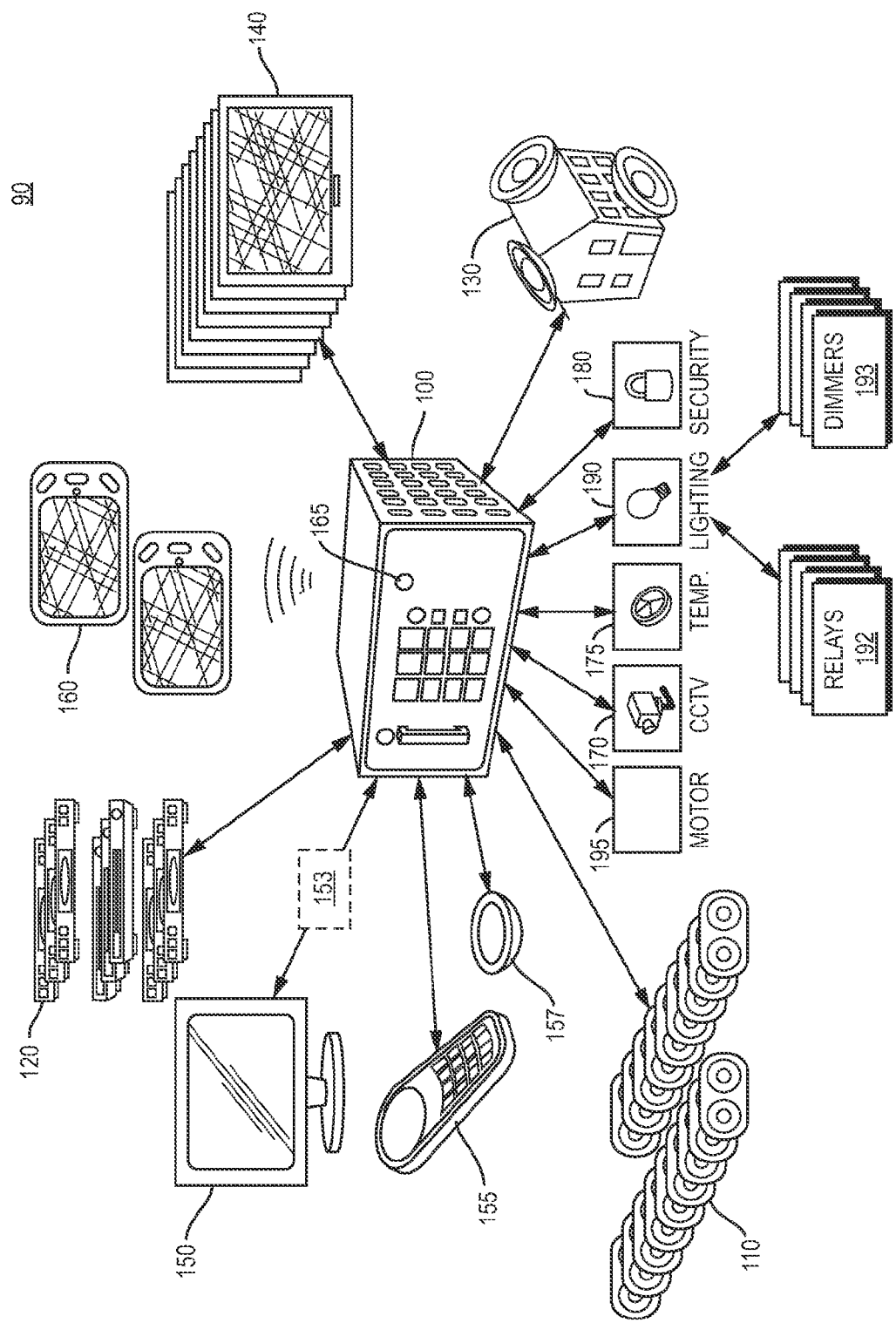
FIG. 1 is a block diagram of a system which includes a programmable multimedia controller coupled to a number of devices.

FIG. 1 is a block diagram of a system 90 which includes a programmable multimedia controller 100 interconnected to a number of devices. The term "programmable multimedia controller" should be interpreted broadly as a device which includes a general purpose computer and is capable of controlling, switching data among, and/or otherwise interoperating with a variety of electrical and electronic devices, such as audio, video, telephony, data, security, motor-operated, relay-operated, heating, ventilation, and air conditioning (HVAC), energy management and/or other types of devices. A line of programmable multimedia controllers are available from Savant Systems, LLC of Osterville, Mass.

Programmable multimedia controller 100 may be coupled to a variety of A/V devices, including audio source devices 110, such as compact disk (CD) players, digital video disc (DVD) players, microphones, digital video recorders (DVRs), cable boxes, audio/video receivers, personal media players, and other devices that source audio signals; may be coupled to a variety of video source devices 120, such as digital video disc (DVD) players, digital video recorders (DVRs), personal media players and other devices that source video signals; may be coupled to a variety of audio output devices 130, such as speakers, devices that incorporate speakers, and other devices that output audio; and may be coupled to a variety of video output devices 140, such as televisions, monitors, and other devices that output video.

Further, programmable multimedia controller 100 may be coupled to, control, and otherwise interoperate with a variety of other types of devices, either directly, or through one or more intermediate controllers. For example, programmable multimedia controller 100 may be coupled to a closed-circuit television (CCTV) control system 170 that manages a system of cameras positioned about a home or other structure, HVAC control and/or energy management system 175 that manages HVAC devices to regulate environmental functions and/or energy management devices in the home or other structure, and/or a security system 180 that manages a plurality of individual security sensors in the home or other structure. In response to control commands received from programmable multimedia controller 100, CCTV control system 170, HVAC control system and/or energy management system 175, and security system 180 may manage the devices under their respective immediate control.

Further, programmable multimedia controller 100 may be coupled to, control, and otherwise interoperate with, one or more electronic lighting controllers 190. The one or more electronic lighting controllers 190 may be coupled to, for example, via wired or wireless links, a plurality of relays 192 and/or dimmer units 193 distributed throughout the home or other structure, and wired inline with the electrical feed to individual light fixtures located therein. In response to control commands received from the programmable multimedia controller 100, electronic lighting controllers 190 may selectively trigger relays 192 and/or adjust dimmer units 193 wired inline to particular light fixtures (not shown), to create a desired level of illumination or darkness in different rooms of the home or other structure.

Similarly, programmable multimedia controller 100 may be coupled to, control, and otherwise interoperate with, one or more motor operated device controllers 195, for example, one or more automatic window shade controllers, or other types of controllers. As with lighting control, in response to control commands received from the programmable multimedia controller 100, the motor-operated device controllers 195 may selectively trigger motor-operated devices (not shown) in various rooms of the home or other structure, to achieve desired effects.

Programmable multimedia controller 100 may receive user-input via one or more control units 150, for example, wall-mounted control units, table-top control units, handheld portable control units, and the like, that include a display screen. Control units 150 may include a touch screen interface, a mouse and pointer interface, or other type of interface. Control units 150 may be special-purpose units, dedicated to operating with programmable multimedia controller 100, or general-purpose devices, for example, laptop computers, desktop computers, and the like, configured with software to implement a user interface. In some cases, control units 150 may be coupled to the programmable multimedia controller 100 via an intermediate device 153, such a computer, via a wired or wireless connections or networks. In other cases, control units 150 may communicate directly to programmable multimedia controller 100.

Programmable multimedia controller 100 may also receive user-input via one or more handheld button-centric remote control units and/or wall mounted button-centric control units 155, or from one or more handheld remote control units including an annular touch sensor 157. Remote control units including an annular touch sensor 157 may be adapted to manipulate, and make control selections using, an on-screen menuing system, displayed on a display device. Further details regarding remote control units including an annular touch sensor may be found in Madonna et al., U.S. patent application Ser. No. 11/520,328, filed Sep. 13, 2006 and titled "Remote Control Unit for a Programmable Multimedia Controller," the contents of which are incorporated by reference herein in their entirety.

The programmable multimedia controller 100 may also receive user-input via one or more mobile devices 160. As used herein, the term "mobile device" refers to electronic devices that are adapted to be transported on one's person, including multimedia smartphones, such as the iPhone® multimedia phone available from Apple Inc. and the Blackberry® device available from Research In Motion Limited, multi-purpose tablet computing devices, such as the iPad® tablet available from Apple Inc., portable media players with enhanced capabilities, such as the iPod® touch available from Apple Inc., personal digital assistants (PDAs), electronic book readers, and the like. Such mobile devices may communicate directly with programmable multimedia controller 100, or indirectly through various wireless, cellular, and/or wired networks (not shown).

Further, programmable multimedia controller 100 may receive user-input via a touch screen or other interface integrated into programmable controller multimedia 100 itself, for example, a touch screen or other interface presented on a front panel 165 of programmable multimedia controller 100. Still further, programmable multimedia controller 100 may receive user-input via a touch screen integrated into a video output device 140, such as a television.

In response to user-input from any of control units 150, button-centric remote control units and/or wall mounted button-centric control units 155, remote control units including an annular touch sensor 157, mobile devices 160, front panel 165 and/or video output devices 140, programmable multimedia controller 100 may switch data among, issue control commands to, and/or otherwise interoperate with, audio source devices 110, video source devices 120, audio output devices 130, and/or video output devices 140. Further, in response to the user-input, programmable multimedia controller 100 may issue control commands to, and otherwise interoperate with, CCTV control system 170, HVAC control and/or energy management system 175, security system 180, electronic lighting controllers 190, as well as motor operated device controllers 195.

Figure 2:
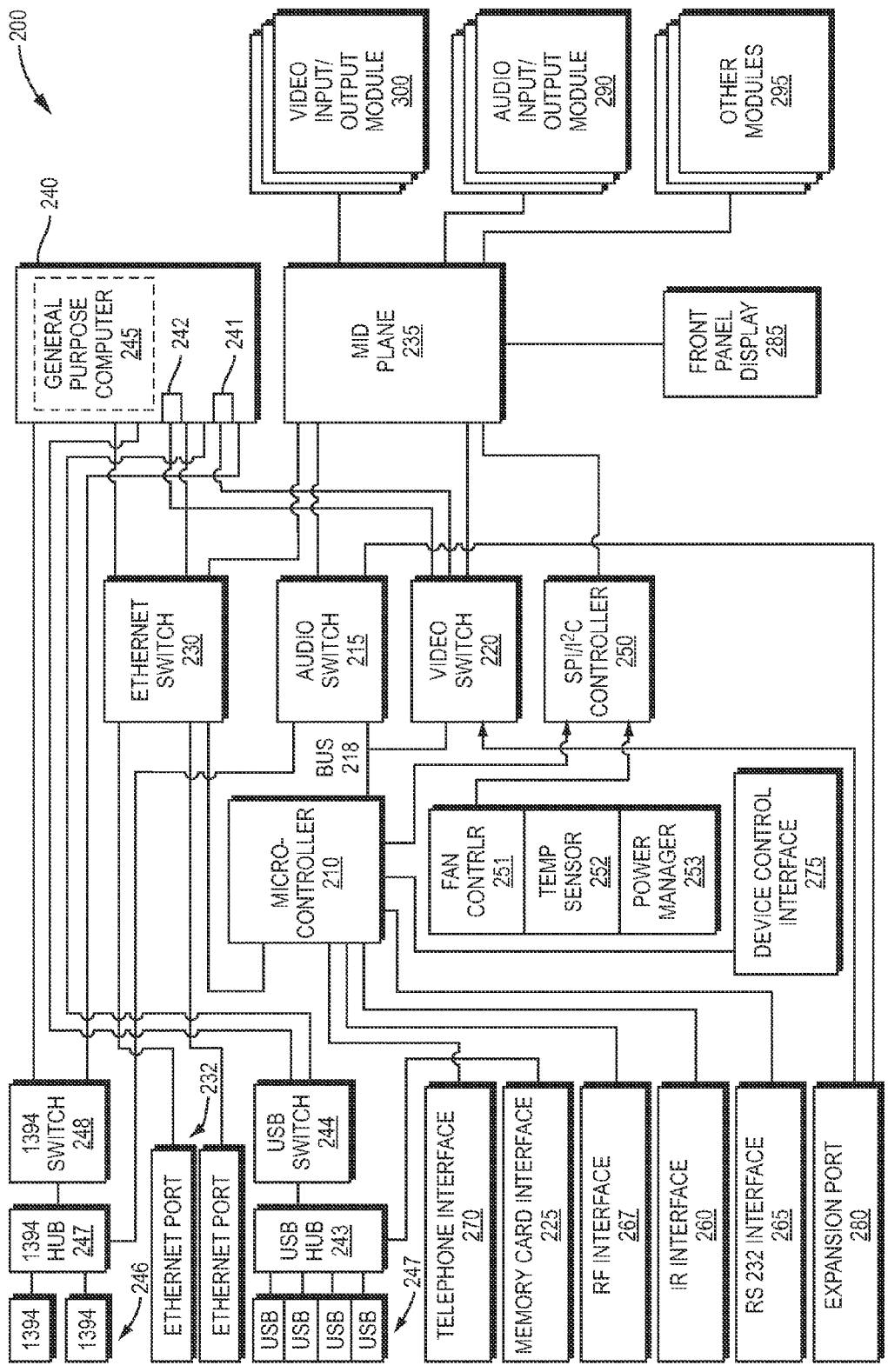
FIG. 2 is a block diagram of a high-level hardware architecture of the programmable multimedia controller shown in FIG. 1.

FIG. 2 is a schematic block diagram of an example high-level hardware architecture 200 for programmable multimedia controller 100. The various components shown may be arranged on a "motherboard" of programmable multimedia controller 100, or on a plurality of circuit cards interconnected by a backplane (not shown). A microcontroller 210 manages the general operation of programmable multimedia controller 100. Microcontroller 210, in some configurations, is coupled to an audio switch 215 and a video switch 220 via a bus 218. Audio switch 215 and video switch 220 are preferably crosspoint switches capable of switching a number of connections simultaneously. However, many other types of switches capable of switching digital signals may be employed, for example Time Division Multiplexing (TDM) switches or other devices. Further, while two separate switches 215, 220 are shown, audio and video switching may be consolidated into a single switch that supports switching of both types of data, or the switches 215, 220 may not be present in some configurations.

A mid plane 235 interconnects the audio and video switches 215, 220 to a variety of input and output modules, for example, one or more Video Input/Output Modules 300, one or more Audio Input/Output Modules 290, and/or one or more other modules 295. Mid plane 235 is further coupled to an Ethernet switch 230 that permits switching of 10BaseT, 100BaseT, Gigabyte Ethernet and/or other types of data signals. Ethernet switch 230 interconnects Ethernet ports 232 and a processing subsystem 240 to the microcontroller 210.

In one embodiment, a processing subsystem 240 includes one or more "general-purpose computers" 245. A general-purpose computer 245, as used herein, refers to a device that is configured to execute a set of instructions, and depending upon the particular instructions executed, may perform a variety of different functions or tasks. Typically, but not always, a general-purpose computer 245 executes a general-purpose operating system, such as the Windows® operating system, available from Microsoft Corporation, the Linux® operating system, available from a variety of vendors, the OSX® operating system, available from Apple Inc., or another operating system. A general-purpose computer 245 may have any of a variety of form factors. For example, a general-purpose computer 245 may be a Central Processing Unit (CPU) card, a Single Board Computer (SBC), a PC/104 processing module, a conventional ATX form factor motherboard and CPU, an "off-the-shelf" small form factor general-purpose personal computer including a case, power supply, and other accessories, an "off-the-shelf" large form factor general-purpose personal computer including a case, power supply, and other accessories, and/or a rack-mount general-purpose personal computer including a case, power supply, and other accessories. General-purpose computer 245 may include a storage device, for example a hard drive, a compact disc read-only memory (CDROM) drive, a Flash memory, or other type of storage device, and/or may be interconnected to a storage device provided elsewhere in the processing subsystem 240.

Processing subsystem 240 preferably has one or more graphics outputs 241, 242 such as analog Video Graphics Array (VGA) connectors, Digital Visual Interface (DVI) connectors, Apple Display Connector (ADC) connectors, or other type of connectors, for supplying graphics. Such graphics outputs 241, 242 may, for example, be supplied directly from the one or more general-purpose computers 245 of the processing subsystem 240. As used herein, the term "graphics" should be interpreted broadly to encompass a wide variety of computer graphics, text, full-motion video, still images, or other types of visual data, represented in any of a variety of different color spaces, for example RGB, YCrCb, and the like, at any of a variety of different color depths, for example 8-bit color, 16-bit color, 24-bit color, 32-bit color, and the like. The graphics from the processing subsystem 240 are passed to video switch 220, in some configurations, and then switched to other parts of the programmable multimedia controller 100, for example to Video Input/Output Module 300. Alternately, the graphics from the processing subsystem 240, in some arrangements, may pass directly to a module, such as Video Input/Output Module 300.

A number of Universal Serial Bus (USB) ports 247 interconnected to a USB hub 243. A memory card interface 225 is also connected to the USB hub 243. The interface may accept one or more well-known memory card formats, for example CompactFlash™ cards, Memory Stick™ cards, Secure Digital™ (SD) cards, or other formats. A USB switch 244 is employed to switch USB links to the processing subsystem 240. In a similar manner, a number of IEEE 1394 (FireWire™) ports 246 are interconnected to an IEEE 1394 hub 247 and to an IEEE 1394 switch 248, for switching to the processing subsystem 240.

Microcontroller 210 is further connected to a Serial Peripheral Interface (SPI) and Inter-Integrated Circuit (I²C) distribution circuit 250, which provides a serial communication interface to relatively low data transfer rate devices. The SPI/I²C controller 250 is connected to the mid plane 235 and thereby provides control commands from the microcontroller 210 to the modules 290, 295, 300 and other devices of the programmable multimedia controller 100. Further, connections from the SPI/I²C controller 250 are provided to devices such as a fan controller 251, a temperature sensor 252, and a power manager circuit 253, which collectively manage the thermal characteristics of the programmable multimedia controller 100 and prevent overheating.

Microcontroller 210 is also connected to an Infra-Red (IR) interface 260, an RS232 interface 265, and a RF interface 267, that permit further interconnection with external devices. Also, a device control interface 275 is provided to communicate with lighting, home automation, and motor and/or relay operated devices. It is expressly contemplated that various other interfaces, including WiFi, Bluetooth™, ZigBee™ and/or other wired and wireless interfaces, may be employed by the programmable multimedia controller 100.

Finally, an expansion port 280 is provided for linking several programmable multimedia controllers 100 together, to form an expanded system, while a front panel display 285, for example a touch screen Liquid Crystal Display (LCD) display, is provided to display status, configuration, and/or other information to a user, as well as to accept user input.

Figure 3:
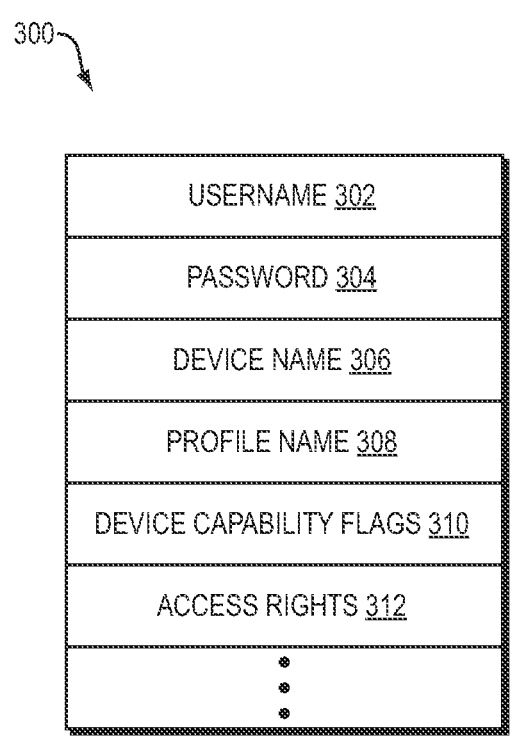
FIG. 3 is a schematic block diagram of a user profile constructed in accordance with one aspect of the present invention.

In order to manage user access to and control over programmable multimedia controller 100, one or more user profiles may be created as part of a process of configuring controller 100. Once created, such user profiles may be stored in processing subsystem 240 within programmable multimedia controller 100. As shown in FIG. 3, a user profile 300 includes several types of information. In general, user profile 300 includes the information necessary to identify an appropriate user interface to a user associated with the profile. A username 302 and password 304, which may be entered by a user (not shown) to gain access to programmable multimedia controller 100, are provided. A device name 306, which is a name assigned to the device (e.g., the user's iPad®, iPhone® or other device) that a particular user will use to interact with programmable multimedia controller 100, is provided. A profile name 308, which is a name assigned to the user profile, is provided. Device capability flags 310, which indicate particular capabilities of the user's device (e.g. SSL support, the supported server-side software version and others), are provided. Access rights 312, which specifies a level of access to programmable multimedia controller 100 to which the user is permitted, is provided. Additional information may also be included in user profile 300.

Figure 4:
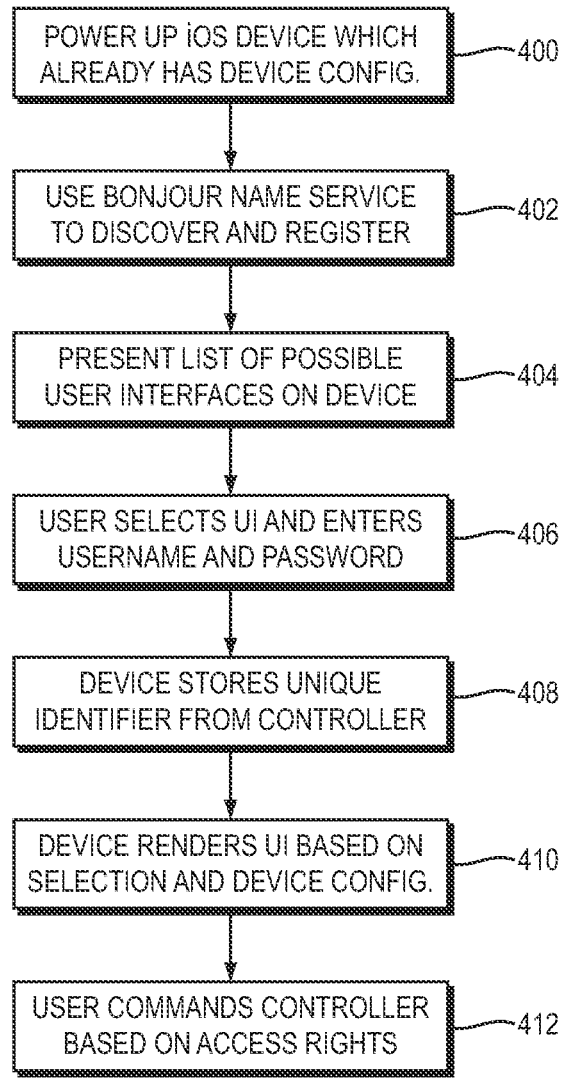
FIG. 4 is a flowchart illustrating the steps by which a user may gain access to the programmable multimedia controller of FIG. 1 based on entry of a valid username and password and the access rights specified in an associated user profile.

FIG. 4 is a flowchart illustrating the steps by which a user may gain access to and control over programmable multimedia controller 100 (FIG. 1). At step 400, a user powers up a device, for example an iOS device such as an iPhone®, iPad® or iPod® touch from Apple Inc., which the user intends to use to control programmable multimedia controller 100. The user's device has previously received a device configuration, which is discussed below in connection with FIG. 5, that enables the device to render an appropriate user interface for interaction with programmable multimedia controller 100.

At step 402, the user's device and programmable multimedia controller 100 use the Bonjour Name Service (which is part of OSX) to discover each other and register. Next, at step 404, the user's device displays a list of possible user interfaces that the device supports. At step 406, the user selects a desired user interface and, in response to a prompt, enters a username and password. Assuming that programmable multimedia controller 100 is able to validate the username and password entered by the user (i.e., by comparing them to the username and password stored in the user's associated user profile), controller 100 provides a unique identifier to the user's device which is stored therein at step 408.

Next, at step 410, the user's device renders an appropriate user interface. The rendered user interface is based on the selection made by the user at step 406 and the device configuration previously stored in the device. At step 412, the user may issue commands to access and control programmable multimedia controller 100 based on the access rights specified in the associated user profile.

Figure 5:
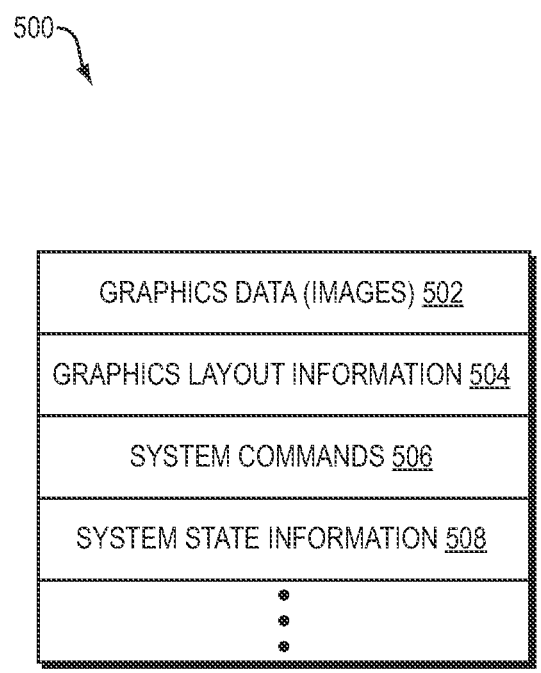
FIG. 5 is a schematic block diagram of a shareable device configuration constructed in accordance with one aspect of the present invention.

As part of the process of configuring programmable multimedia controller 100, one or more shareable device configurations may be created. Once created, such shareable device configurations may be initially stored in processing subsystem 240 (FIG. 2) within programmable multimedia controller 100. FIG. 5 shows a shareable device configuration 500. In general, shareable device configuration 500 includes the graphics, layout and metadata necessary to render an appropriate user interface on the device which is associated with the configuration. Specifically, shareable device configuration 500 includes graphics data 502 which is typically images that will appear in the user interface. Graphics layout information 504 specifies the spatial relationships to be applied to graphics data 502 to properly render the user interface. System commands 506 specifies the system commands that are valid with a particular combination of graphics data 502 and graphics layout information 504. System state information 508 provides the necessary state information for the device associated with configuration 500 to communicate with a run time system on programmable multimedia controller 100. Additional information may also be included in shareable device configuration 500.

Once a shareable device configuration has been created and initially stored in processing subsystem 240 within programmable multimedia controller 100, a copy of that configuration may be transferred to an appropriate device such as one of mobile devices 160 (FIG. 1). Further, once a copy of the shareable device configuration is stored, for example, in one of mobile devices 160, that device may be considered a master device with respect to other devices of the same type. Thus, when other devices of the same type as the master device (i.e., other devices which would need the same device configuration) are being added to system 90, such non-master devices may obtain a copy of the shareable device configuration from the master device in which it is stored as opposed to the programmable multimedia controller 100. Such distribution of a shareable device configuration may be done using Wi-Fi or other wireless or wired communication functionalities typically found in mobile devices.

The foregoing description has been directed to particular embodiments of this invention. It will be apparent, however, that other variations and modifications may be made to the described embodiments, with the attainment of some or all of their advantages. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method comprising:
configuring a programmable multimedia controller to interface with and control one or more audio, video, telephony or heating ventilation, and air conditioning (HVAC) devices;
obtaining, by a first mobile device in communication with the programmable multimedia controller, a first copy of a sharable device configuration, the sharable device configuration including data for rendering a user interface usable to control the programmable multimedia controller, the first mobile device being of a type of devices;
storing the first copy of the sharable device configuration on the first mobile device, storage on the first mobile device to cause the first mobile device to be considered a master device with respect to other devices of a same type; and
obtaining, by a second mobile device of the same type, a second copy of the sharable device configuration for use on the second mobile device from the master device such that copies of the sharable device configuration are shared among mobile devices of the same type.

2. The method of claim 1, wherein the obtaining by the first mobile device obtains the first copy of the sharable device configuration for use on the first mobile device from the programmable multimedia controller.

3. The method of claim 1, wherein the obtaining by the second mobile device is in response to addition of the second mobile device to a system within a structure that includes the programmable multimedia controller, the one or more audio, video, telephony or HVAC devices, and the first mobile device.

4. The method of claim 1, wherein the obtaining by the first mobile device and the obtaining by the second mobile device are via WiFi.

5. The method of claim 1, wherein the sharable device configuration includes graphics data for graphics that appears in the user interface usable to control the programmable multimedia controller.

6. The method of claim 5, wherein the sharable device configuration includes graphics layout information specifying spatial relationships to be applied to the graphics data to render the user interface usable to control the programmable multimedia controller.

7. The method of claim 6, wherein the sharable device configuration includes an indication of system commands that are valid with a particular combination of graphics data and graphics layout information.

8. The method of claim 1, wherein the sharable device configuration includes system state information used in communication with the programmable multimedia controller.

9. The method of claim 1, wherein the sharable device configuration includes data for rendering multiple different user interfaces, the rendered user interface being based on a selection made by a user.

10. The method of claim 1, wherein the sharable device configuration includes data for rendering multiple different user interfaces, the rendered user interface determined based on validating a username and password against a profile of a user.

11. A system comprising:
a programmable multimedia controller that is capable of interfacing with and controlling audio, video, telephony or heating ventilation, and air conditioning (HVAC) devices;
a first mobile device configured to communicate with the programmable multimedia controller, the first mobile device being of a type of devices;
a second mobile device configured to communicate with the programmable multimedia controller, the second mobile device being of a same type of devices as the first mobile device;
a first copy of a sharable device configuration including data for rendering a user interface usable to control the programmable multimedia controller, the first copy of the sharable device configuration stored on the first mobile device, storage on the first mobile device to cause the first mobile device to be considered a master device with respect to other devices of the type; and
a second copy of the sharable device configuration used on the second mobile device, the second copy of the sharable device configuration obtained from the master device.

12. The system of claim 11, wherein the sharable device configuration includes graphics data for graphics that appears in the user interface usable to control the programmable multimedia controller.

13. The system of claim 12, wherein the sharable device configuration includes graphics layout information specifying spatial relationships to be applied to the graphics data to render the user interface usable to control the programmable multimedia controller.

14. The system of claim 13, wherein the sharable device configuration includes an indication of system commands that are valid with a particular combination of graphics data and graphics layout information.

15. The system of claim 11, wherein the sharable device configuration includes system state information used in communication with the programmable multimedia controller.

16. The system of claim 11, wherein the second mobile device is configured to obtain the copy of the sharable device configuration obtained from the master device when the second mobile device is added to the system.

17. The system of claim 11, wherein the master device is configured to distribute the shareable device configuration to the second mobile device using WiFi.

18. A programmable multimedia controller, comprising:
one or more interfaces configured to communicate with audio, video, telephony or heating ventilation, and air conditioning (HVAC) devices, and to issue control commands thereto; and
a processing subsystem configured to store a sharable device configuration that includes data for rendering a user interface usable to control the programmable multimedia controller, and executable program instructions that when executed are operable to:
transfer a first copy of the sharable device configuration from the programmable multimedia controller to a first device, the first device being of a type of devices, the first device to be considered a master device with respect to other devices of a same type,
receive user input from a user interface rendered on the first device using the first copy of the sharable device configuration, and
receive user input from a user interface rendered on a second device of the same type that was rendered using a second copy the sharable device configuration obtained from the master device.

19. The programmable multimedia controller of claim 18, wherein the first device and the second device are mobile devices.

20. The programmable multimedia controller of claim 18, wherein the sharable device configuration includes graphics data, graphics layout information specifying spatial relationships to be applied to the graphics data, system commands that are valid with a particular combination of graphics data and graphics layout information, and state information.

* * * * *